United States Patent
Saleh et al.

(10) Patent No.: US 11,232,622 B2
(45) Date of Patent: Jan. 25, 2022

(54) DATA FLOW IN A DISTRIBUTED GRAPHICS PROCESSING UNIT ARCHITECTURE

(71) Applicant: ADVANCED MICRO DEVICES, INC., Santa Clara, CA (US)

(72) Inventors: Skyler J. Saleh, San Diego, CA (US); Ruijin Wu, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/698,624

(22) Filed: Nov. 27, 2019

(65) Prior Publication Data

US 2021/0158599 A1 May 27, 2021

(51) Int. Cl.
G06T 15/00 (2011.01)
G06T 1/20 (2006.01)
G06F 9/54 (2006.01)

(52) U.S. Cl.
CPC ............ G06T 15/005 (2013.01); G06F 9/544 (2013.01); G06T 1/20 (2013.01)

(58) Field of Classification Search
None
See application file for complete search history.

(56) References Cited

U.S. PATENT DOCUMENTS

| 8,860,741 | B1 | 10/2014 | Juffa et al. |
| 10,282,811 | B2 | 5/2019 | Ray et al. |
| 10,803,548 | B2 | 10/2020 | Matam et al. |
| 2001/0005873 | A1 | 6/2001 | Yasuda et al. |
| 2011/0087864 | A1* | 4/2011 | Duluk, Jr. ........... G06F 9/30087 712/220 |
| 2012/0330802 | A1 | 12/2012 | Guthrie et al. |
| 2013/0286034 | A1* | 10/2013 | Diard .................... G06F 3/1454 345/589 |

(Continued)

FOREIGN PATENT DOCUMENTS

WO 2019032322 A1 2/2019

OTHER PUBLICATIONS

U.S. Appl. No. 16/456,287, filed Jun. 28, 2019 in the name of Skyler J. Saleh, et al.

(Continued)

*Primary Examiner* — Michelle Chin

(57) ABSTRACT

An apparatus includes a command buffer configured to temporarily store commands. The apparatus also includes processing units disposed at a substrate. The processing units are configured to access a plurality of copies of a command from the command buffer. The processing units include first processing units (such as fixed function hardware blocks) to perform geometry operations indicated by the command on a set of primitives. The geometry operations are performed concurrently by the first processing units. The processing units also include second processing units (such as shaders) to process mutually exclusive sets of pixels generated by rasterizing the set of primitives. The apparatus also includes a cache to temporarily store the pixels after shading by the shaders. The processing units stop or interrupt processing commands in response to detecting a synchronization point and resume processing the commands in response to all the processing units completing commands before synchronization point.

22 Claims, 7 Drawing Sheets

(56) References Cited

U.S. PATENT DOCUMENTS

| | | |
|---|---|---|
| 2014/0001645 A1 | 1/2014 | Lin et al. |
| 2015/0243528 A1 | 8/2015 | Whiting et al. |
| 2017/0062383 A1 | 3/2017 | Vee et al. |
| 2017/0365580 A1 | 12/2017 | Shih et al. |
| 2018/0102251 A1 | 4/2018 | Delacruz et al. |
| 2018/0102338 A1 | 4/2018 | McLellan |
| 2018/0130751 A1 | 5/2018 | Bower |
| 2018/0233470 A1 | 8/2018 | Killer et al. |
| 2018/0246814 A1 | 8/2018 | Jayasena et al. |
| 2018/0293205 A1* | 10/2018 | Koker ............... G06N 3/0445 |
| 2018/0300098 A1* | 10/2018 | Vembar ............... G09G 5/363 |
| 2019/0051633 A1 | 2/2019 | Bhagavat et al. |
| 2019/0089036 A1 | 3/2019 | Kamgaing et al. |
| 2019/0123022 A1 | 4/2019 | Teig et al. |
| 2019/0245582 A1 | 8/2019 | Burton |
| 2020/0176384 A1 | 6/2020 | Wu et al. |
| 2020/0294181 A1 | 9/2020 | Matam et al. |
| 2021/0020602 A1 | 1/2021 | Chen et al. |

OTHER PUBLICATIONS

U.S. Appl. No. 16/585,452, filed Sep. 27, 2019 in the name of Skyler J. Saleh, et al.

U.S. Appl. No. 16/585,480, filed Sep. 27, 2019 in the name of Skyler J. Saleh, et al.

Non-Final Office Action for U.S. Appl. No. 16/456,287 dated Sep. 11, 2020.

International Search Report and Written Opinion for PCT/US2020/039326 dated Oct. 13, 2020, 10 pages.

Jieming Yin et al., "Modular Routing Design for Chiplet-based Systems", pp. 726-738, 2018 [retrieved on Oct. 5, 2019]. Retrieved from <URL: https://www.eecg.utoronto.ca/~enright/modular-isca.pdf>.

Akhil Arunkumar et al., "MCM-GPU: Multi-Chip-Module GPUs for Continued Performance Scalability", 2017 [retrieved on Oct. 5, 2019]. Retrieved from <URL: https://research.nvidia.com/sites/default/files/publications/ISCA_2017_MCMGPU.pdf>.

Non-Final Office Action dated Jan. 4, 2021 in U.S. Appl. No. 16/585,452, 25 pages.

International Search Report and Written Opinion dated Dec. 30, 2020 in Application No. PCT/US2020/052433, 12 pages.

Burd, Thomas, et al., "'Zeppelin': An SoC for Multichip Architectures", IEEE Journal of Solid-State Circuits, vol. 54, No. 1, Jan. 2019, pp. 133-143.

International Search Report and Written Opinion dated Dec. 30, 2020 in Application No. PCT/US2020/052444, 12 pages.

Final Office Action dated Jul. 30, 2021 in U.S. Appl. No. 16/585,452, 12 pages.

Non-Final Office Action dated Aug. 17, 2021 in U.S. Appl. No. 16/585,480, 20 pages.

Final Office Action dated May 17, 2021 in U.S. Appl. No. 16/456,287, 20 pages.

\* cited by examiner

DATA FLOW IN A DISTRIBUTED GRAPHICS PROCESSING UNIT ARCHITECTURE

BACKGROUND

A conventional monolithic central processing unit (CPU) includes components such as one or more processor cores for executing instructions, arithmetic logic units (ALUs) for executing mathematical operations, a control unit that regulates the flow of information through the CPU (e.g., by receiving and decoding instructions, storing the results of the instructions and managing the execution of data), input/output (I/O) circuitry, caches to temporarily cache frequently used information, and registers that are used to configure the CPU, temporarily store (or hold) data that is to be processed, and temporarily store the results of processing. In the past, the biannual doubling of the number of transistors in a dense integrated circuit predicted by Moore's Law allowed more functionality and capability to be integrated into a monolithic CPU. Although advances in semiconductor manufacturing processes allow transistors to be fabricated at smaller nodes, e.g., at scales of 14 nanometer (nm) and even 7 nm, not every component in a conventional monolithic CPU benefits from scaling down. For example, reducing the dimensions of contact pads or wires in the conventional monolithic CPU causes an increase in electrical resistance that often outweighs the benefits in power reduction.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
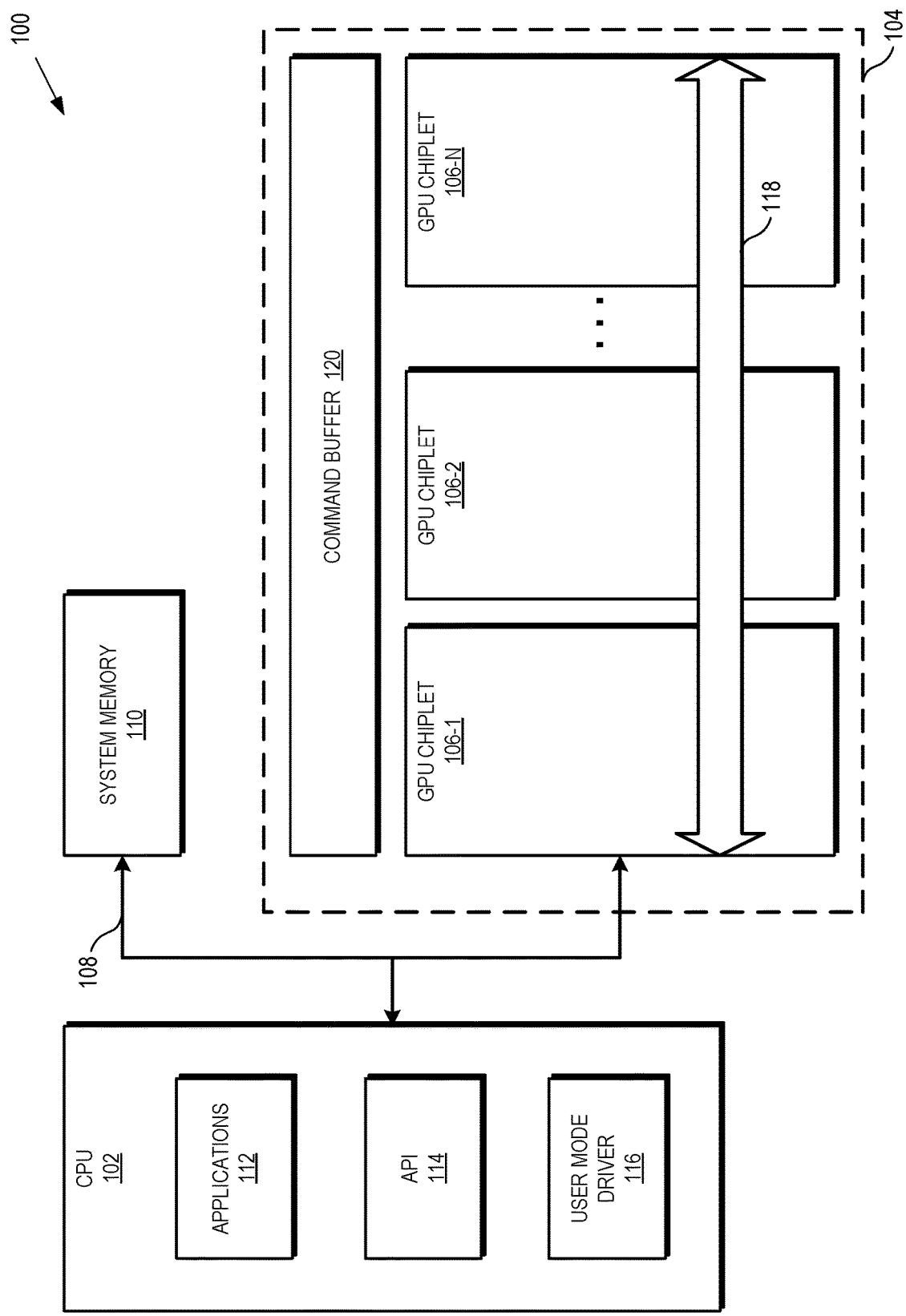
FIG. 1 is a block diagram illustrating a processing system employing an active bridge chiplet for coupling chiplets according to some embodiments.

Distributed architectures provide an alternative to the conventional monolithic processing architecture in which physically or logically separated processing units are operated in a coordinated fashion via a high-performance interconnection. One example of a distributed architecture is a chiplet architecture, which captures the advantages of fabricating some portions of a processing unit at smaller nodes while allowing other portions to be fabricated at nodes having larger dimensions if the other portions do not benefit from the reduced scales of the smaller nodes. As used herein, the term "chiplet" refers to a device that has the following characteristics: (1) includes an active silicon die containing at least a portion of the computational logic that the processing unit uses to solve a full problem (i.e., the computational workload is distributed across multiples of these active silicon dies); (2) is packaged together with other chiplets as a monolithic unit on the same substrate; and (3) the programming model for the processing unit preserves the concept that the combination of these separate computational dies (i.e., the chiplets) are a single monolithic unit, i.e., each chiplet is not exposed as a separate device to an application that uses the chiplets for processing computational workloads. In some cases, a first type of chiplet in a processing unit includes one or more processor cores, one or more caches, and one or more memory interfaces. A second type of chiplet in the processing unit includes I/O circuitry or a control unit.

Chiplets have been used successfully in central processing unit (CPU) architectures to reduce cost of manufacture and improve yields, as the heterogeneous computational nature of CPUs is naturally suited to partitioning the CPU cores into distinct units that do not require much inter-communication. In contrast, graphics processing units (GPUs) are typically designed to execute instructions concurrently or in parallel, as well as supporting synchronous ordering between different sections of the GPU that are executing different subsets of the instructions. Accordingly, a GPU programming model that spreads sections of work on different threads is often inefficient because the parallelism is difficult to distribute across multiple different working groups and chiplets. In particular, synchronizing the contents of shared memory resources throughout the entire system to provide a coherent view of the memory to applications is difficult and computationally expensive. Additionally, from a logical point of view, applications are written using a programming model that assumes that the system has a single GPU. That is, even though a conventional GPU includes many GPU cores, applications are programmed as addressing a single device. For at least these reasons, it has been historically challenging to bring chiplet design methodology to GPU architectures.

FIGS. 1-7 disclose embodiments of techniques for performing graphics processing in a distributed architecture that includes one or more GPUs, GPU cores, or chiplets that communicate via a high-performance interconnection such as a peripheral component interconnect (PCI, PCI-E) bus. The GPUs, GPU cores, or chiplets are referred to herein as "processing units." Processing in the distributed architecture is divided into a geometry portion that operates on primitives prior to rasterization and a pixel portion that operates on pixels following rasterization. The geometry workload is typically a single stream of primitives that is required to satisfy the following requirements: (1) the ordering of input primitives is preserved in the output and (2) the processing of a primitive depends on the order of the primitives in the stream. Due to these requirements, parallelization of the geometry portion typically requires a high bandwidth, low latency interconnection and synchronization between different processing units. The distributed architecture disclosed herein includes multiple processing units that each process a copy of the stream of geometry primitives, which trades the cost of the high bandwidth, low latency interconnection for the cost of the duplicated computation. The pixel workload does not require the same coordination and is therefore partitioned into mutually exclusive sets of pixels that are processed by different subsets of the processing units.

Depending on the circumstances, the processing units that operate on the geometry primitives are implemented using only fixed function hardware blocks, only shaders, or a combination of fixed function hardware blocks and shaders. Similarly, depending on the circumstances, the processing units that operate on the pixel workload are implemented using only fixed function hardware blocks, only shaders, or a combination of fixed function hardware blocks and shaders. In some embodiments, the processing units that operate on the geometry primitives are implemented using fixed function hardware blocks and the processing units that operate on the pixel workload are implemented using shaders.

Some embodiments of the distributed architecture include a command buffer to receive commands from a central processing unit (CPU), a plurality of processing units that access commands from the command buffer, and a coherent cache that is shared by the plurality of processing units. Each of the processing units includes a command processor that reads commands from the command buffer and one or more processing units (such as fixed function hardware blocks) that execute commands to perform geometry operations on primitives (such as triangles). Some embodiments of the distributed architecture include two chiplets and the corresponding two command processors access copies of the same commands from the command buffer. For example, fixed function hardware blocks perform the same geometry operations on the same set of primitives. Rasterizers in the processing units rasterize the primitives following the geometry operations to generate pixels that are subsequently used in pixel processing.

Different subsets of processing units operate on mutually exclusive sets of pixels. In some embodiments, each of the processing units implements one or more shaders that operate on the pixels generated by rasterizing the primitives. Mutually exclusive sets of adjacent pixels are processed by the different subsets of the processing units, which is referred to herein as checkerboarding the pixels that are processed by the different processing units. For example, if two chiplets are implemented in a GPU, one half the pixels are shaded by the first chiplet and the other half of the pixels are shaded by the second chiplet. One of the processing units is a primary processing unit that includes a primary command processor and the remaining ones of the processing units are secondary processing units that include secondary command processors. Low latency signals are exchanged between the primary and secondary command processors at synchronization points in the command stream to ensure that the plurality of processing units do not begin executing commands subsequent to a synchronization point until all the plurality of processing units of completed executing commands prior to the synchronization point.

FIG. 1 is a block diagram illustrating a processing system 100 employing an active bridge chiplet for coupling GPU chiplets according to some embodiments. The processing system 100 includes a central processing unit (CPU) 102 for executing instructions and an array 104 of one or more GPU chiplets, such as the three illustrated GPU chiplets 106-1, 106-2, 106-N, which are collectively referred to herein as "the GPU chiplets 106." As used herein, the term "chiplet" refers to any device having the following characteristics: 1) a chiplet includes an active silicon die containing at least a portion of the computational logic used to solve a full problem (i.e., the computational workload is distributed across multiples of these active silicon dies); 2) chiplets are formed on the same substrate and packaged together as a monolithic unit; and 3) the programming model preserves the concept that the combination of these separate computational dies (i.e., the GPU chiplets 106) are a single monolithic unit. Thus, the GPU chiplets 106 are not exposed as separate devices to an application that uses the GPU chiplets 106 for processing computational workloads. Although three GPU chiplets 106 are shown in FIG. 1, the number of GPU chiplets in the chiplet array 104 is a matter of design choice and varies in other embodiments, such as described in more detail below.

Persons of ordinary skill in the art should appreciate that the techniques disclosed herein are not limited to distributed architectures formed of a set of interconnected chiplets such as the chiplets 106 shown in FIG. 1. Some embodiments of the techniques herein are used to support coordinated operation of other processing units in a distributed architecture such as multiple GPUs or GPU cores, which communicate via an interconnection such as a peripheral component interface (PCI, PCI-E) bus.

Some embodiments of the CPU 102 are connected via a bus 108 to a system memory 110, such as a dynamic random access memory (DRAM), static random access memory (SRAM), nonvolatile RAM, and the like. In the illustrated embodiment, the CPU 102 communicates with the system memory 110 and the GPU chiplet 106-1 over bus 108 that is implemented as a PCI bus, PCI-E bus, or other type of bus. However, some embodiments of the system 100 includes the GPU chiplet 106-1 communicating with the CPU 102 over a direct connection or via other buses, bridges, switches, routers, and the like.

As illustrated, the CPU 102 executes a number of processes, such as one or more applications 112 that generate graphic commands, a user mode driver 116 or other drivers, such as a kernel mode driver (not shown in the interest of clarity). The applications 112 include applications that utilize the functionality of the GPU chiplets 106, such as applications that generate work in the system 100 or an operating system (OS). Some embodiments of the application 112 include one or more graphics instructions that instruct the GPU chiplets 106 to render a graphical user interface (GUI), a graphics scene, or other image or combination of images for presentation to a user. For example, the graphics instructions can include instructions that define a set of one or more graphics primitives to be rendered by the GPU chiplets 106.

Some embodiments of the application 112 utilize a graphics application programming interface (API) 114 to invoke a user mode driver 116 or other GPU driver. User mode driver 116 issues one or more commands to the array 104. The commands instruct the GPU chiplets 106 in the array 104 to render one or more graphics primitives into displayable graphics images. Based on the graphics instructions issued by application 112 to the user mode driver 116, the user mode driver 116 formulates one or more graphics commands that specify one or more operations for GPU chiplets 106 to perform for rendering graphics. In some embodiments, the user mode driver 116 is a part of the application 112 running on the CPU 102. For example, a gaming application running on the CPU 102 can implement the user mode driver 116. Similarly, some embodiments of an operating system running on the CPU 100 and to implement a kernel mode driver (not shown).

An active bridge chiplet 118 couples the GPU chiplets 106 (i.e., GPU chiplets 106-1 through 106-N) to each other. In some embodiments, such as discussed below in more detail with respect to FIG. 2, the active bridge chiplet 118 includes an active silicon bridge that serves as a high-bandwidth die-to-die interconnect between GPU chiplet dies. Additionally, the active bridge chiplet 118 operates as a memory crossbar with a shared, unified last level cache (LLC) to provide inter-chiplet communications and to route cross chiplet synchronization signals. Caches are naturally an active component (i.e., require electrical power for operations), so the memory crossbar (e.g., the active bridge chiplet 118) is active for holding those cache memories. Cache sizing is configurable, as a function of the physical size of the active bridge chiplet 118, for different applications along with different chiplet configurations, and the base chiplets (e.g., the GPU chiplets 106) to which the active bridge chiplet 118 is coupled do not pay the cost (e.g., costs related to physical space, power constraints, and the like) of this external cache on the active bridge chiplet 118.

As a general operational overview, the CPU 102 is coupled to a single GPU chiplet 106-1 through the bus 108 and the GPU chiplet 106-1 is referred to as a "primary" chiplet. The GPU chiplet 106-1 receives CPU-to-GPU transactions or communications that are transmitted from the CPU 102 to the array 104. Subsequently, any inter-chiplet communications are routed through the active bridge chiplet 118 as appropriate to access memory channels on other GPU chiplets 106. In this manner, the GPU chiplet-based system 100 includes GPU chiplets 106 that are addressable as a single, monolithic GPU from a software developer's perspective (e.g., the CPU 102 and any associated applications/drivers are unaware of the chiplet-based architecture), and therefore avoids requiring any chiplet-specific considerations on the part of a programmer or developer.

The processing system 100 supports a programming model that allows the array 104 to be addressed as a single device (e.g., using a single address) by implementing a command buffer 120 that receives commands from the CPU 102. Each of the GPU chiplets 106 includes a command processor that reads copies of the commands from the command buffer 120. In the illustrated embodiment, the command buffer 120 provides a first copy of the first command to the GPU chiplet 106-1, a second copy of the first command to the GPU chiplet 106-2, a third copy of the first command to the GPU chiplet 106-N, and additional copies to any other GPU chiplets in the array 104. The GPU chiplets implement processing units to perform geometry operations and pixel shading. In some embodiments, one or more fixed function hardware blocks in each of the GPU chiplets 106 execute the copies of the first command to perform geometry operations on primitives (such as triangles). The fixed function hardware blocks perform the same geometry operations on the same set of primitives. In some embodiments, the GPU chiplets 106 also implement one or more shaders that operate on pixels generated by rasterizing the primitives. Mutually exclusive sets of adjacent pixels are processed by the different chiplets, which is referred to herein as "checkerboarding" the pixels that are processed by the different GPU chiplets 106.

The active bridge chiplet 118 supports the exchange of low latency signals between the GPU chiplets 106. In some embodiments, command processors in the GPU chiplets 106 detect synchronization points in the command stream and stop (or interrupt) processing of commands in the command buffer 120 until all the GPU chiplets 106 have completing processing commands prior to the synchronization point. The primary GPU chiplet 106-1 monitors low latency signals exchanged with the secondary GPU chiplets 106-2, . . . , 106-N to determine whether all the GPU chiplets 106 have completed processing of the commands prior to the synchronization point. In response to determining that all the GPU chiplets 106 have completed processing the commands prior to the synchronization point, the primary GPU chiplet 106-1 provides a signal instructing the secondary GPU chiplets 106-2, . . . , 106-N to resume processing commands subsequent to the synchronization point. The GPU chiplets 106 then resume processing the commands subsequent to the synchronization point.

Figure 2:
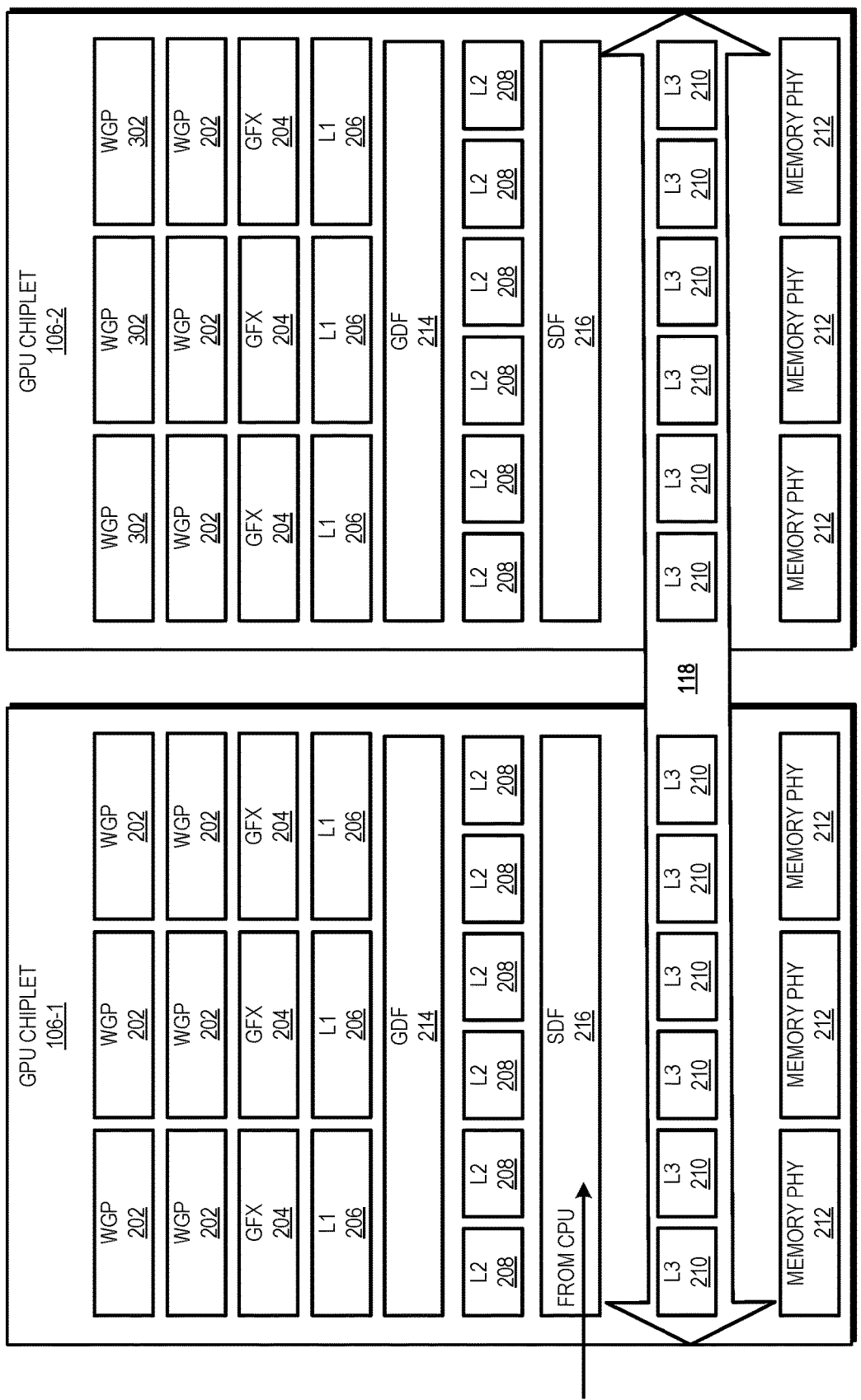
FIG. 2 is a block diagram illustrating an array of chiplets coupled by an active bridge chiplet according to some embodiments.

FIG. 2 is a block diagram illustrating an array 200 of GPU chiplets coupled by an active bridge chiplet according to some embodiments. The array 200 provides a hierarchical view of a cache hierarchy that is (at least partially) shared by GPU chiplets 106-1, 106-2, and the active bridge chiplet 118 shown in FIG. 1. Each of the GPU chiplets 106-1, 106-2 include a plurality of workgroup processors 202 (WGP) that are used to implement one or more shaders that perform pixel processing operations. The GPU chiplets 106-1, 106-2 also include a plurality of fixed function blocks 204 (also referred to as "GFX 204") that perform geometry operations on primitives such as triangles that represent portions of a graphics image.

The array 200 implements a cache hierarchy that includes L1 cache 206, L2 cache 208, and L3 cache 210 that is implemented in the active bridge chiplet 118. In the illustrated embodiment, the L3 cache 210 is a last level cache (LLC) in the array 200. The WGP 202 and the GFX 204 communicate with different channels of the L1 cache 206. Each GPU chiplet 106 also includes a plurality of memory physical layer interfaces (PHY) 212, which are denoted as graphics double data rate (GDDR) in FIG. 2 to indicate connection to GDDR memory. The memory PHY channels 212 are mapped to the L3 cache 210. Banks of the L2 cache 208 are coherent within a single chiplet, e.g., the banks of the L2 cache 208 within the GPU chiplet 106-1 are coherent with each other and the banks of the L2 cache 208 within the GPU chiplet 106-2 are coherent with each other. The L3 cache 210 (or other last level) of cache is unified and coherent across all the GPU chiplets 106. In other words, the active bridge chiplet 118 includes a unified cache (e.g., the L3/LLC of FIG. 2) that is on a separate die than the GPU chiplets 106 and provides an external unified memory interface that communicably links two or more GPU chiplets 106 together. The GPU chiplets 106 therefore act as a monolithic silicon die starting from the register transfer level (RTL) perspective and provides fully coherent memory access.

Some embodiments of the L3 cache 210 are implemented as a memory-attached last level cache. In conventional cache hierarchies, routing occurs between L1 and L2 levels of cache and between L2 levels and memory channels. This routing allows the L2 cache 208 to be coherent within a single GPU core. However, the routing introduces a synchronization point when a different GPU core that has access to the GDDR memory (such as by the display engine, multi-media core, or the CPU) wants to access the data that is to be manipulated by the GPU core. In that case, the L2 cache 208 is flushed to GDDR memory to allow the other GPU cores to access the most recent data. Such operations are computationally costly and inefficient. In contrast, the memory-attached last level L3 cache 210 that sits between the memory controller and the GPU chiplets 106 avoids these issues by providing a consistent "view" of the cache and memory to all attached cores.

The memory-attached last level L3 cache 210 puts the L3 level of cache hierarchy at the active bridge chiplet 118 instead of at the GPU chiplets 106. Accordingly, if another client accesses data (e.g., CPU accessing data in DRAM), the CPU 102 connects to SDF fabric 216 to read from the L3 cache 210. Furthermore, the L3 cache 210 reads from GDDR memory (not shown, but via memory PHYs 212) if the requested data is not cached in the L3 cache 210. Accordingly, the L2 cache 208 contains coherent data and does not need to be flushed. In some embodiments, instead of the L3 cache 210 being a memory-attached last level, the L3 cache 208 is positioned above the SDF fabric 216 in the cache hierarchy. However, in such a configuration, the L3 cache 208 and the memory PHYS 212 are local to each GPU chiplet 106 and are therefore no longer part of a unified cache at the active bridge chiplet 118.

A graphics data fabric 214 (GDF) of each GPU chiplet 106 connects all of the L1 caches 206 to each of the channels of the L2 cache 208, thereby allowing each of the workgroup processors 202 and fixed function blocks 204 to access data stored in any bank of the L2 cache 208. Each GPU chiplet 106 also includes a scalable data fabric 216 (SDF) (also known as a SOC memory fabric) that routes across the graphics core (GC) and system on chip (SOC) IP cores to the active bridge chiplet 118. The GC includes CUs/WGPs, fixed function graphics blocks, caches above L3, and the like. Portions of the GPU used for traditional graphics and compute (i.e., the GC) are differentiable from other portions of the GPU used for handling auxiliary GPU functionality such as video decode, display output, and various system supporting structures that are contained on the same die.

The active bridge chiplet 118 includes a plurality of L3 cache 210 channels that route to the GPU chiplets (e.g., GPU chiplets 106-1 and 106-2 shown in FIGS. 1 and 2). In this manner, a memory address request is routed to the appropriate lanes on the active bridge chiplet 118 to access the unified L3 cache 210. Further, as the physical dimensions of the active bridge chiplet 118 are sufficient to span across multiple GPU chiplets 106, those skilled in the art will recognize that a scalable amount (which is scalable to increase or decrease amount of memory and logic) of L3 cache 208 and logic is positioned on the active bridge chiplet 118. The active bridge chiplet 118 bridges multiple GPU chiplets 106 and therefore is interchangeably referred to as a bridge chiplet, active bridge die, or active silicon bridge.

Some embodiments of the GPU chiplets 106 implement graphics processing pipelines that concurrently process copies of commands that are retrieved from a command buffer such as the command buffer 120 shown in FIG. 1. The fixed function hardware blocks GFX 204 perform geometry operations on primitives such as triangles that are formed of vertices and edges and represent portions of an image. The geometry portion of the graphics pipeline completes when the primitives produced by the fixed function hardware blocks 204 are rasterized to form sets of pixels that represent portions of the image. Subsequent processing is referred to as pixel processing and includes operations performed by shaders that are implemented on the WGP 202. In some embodiments, the shaders implemented by the different GPU chiplets 106 operate on mutually exclusive subsets of the set of pixels, as discussed in detail herein.

Figure 3:
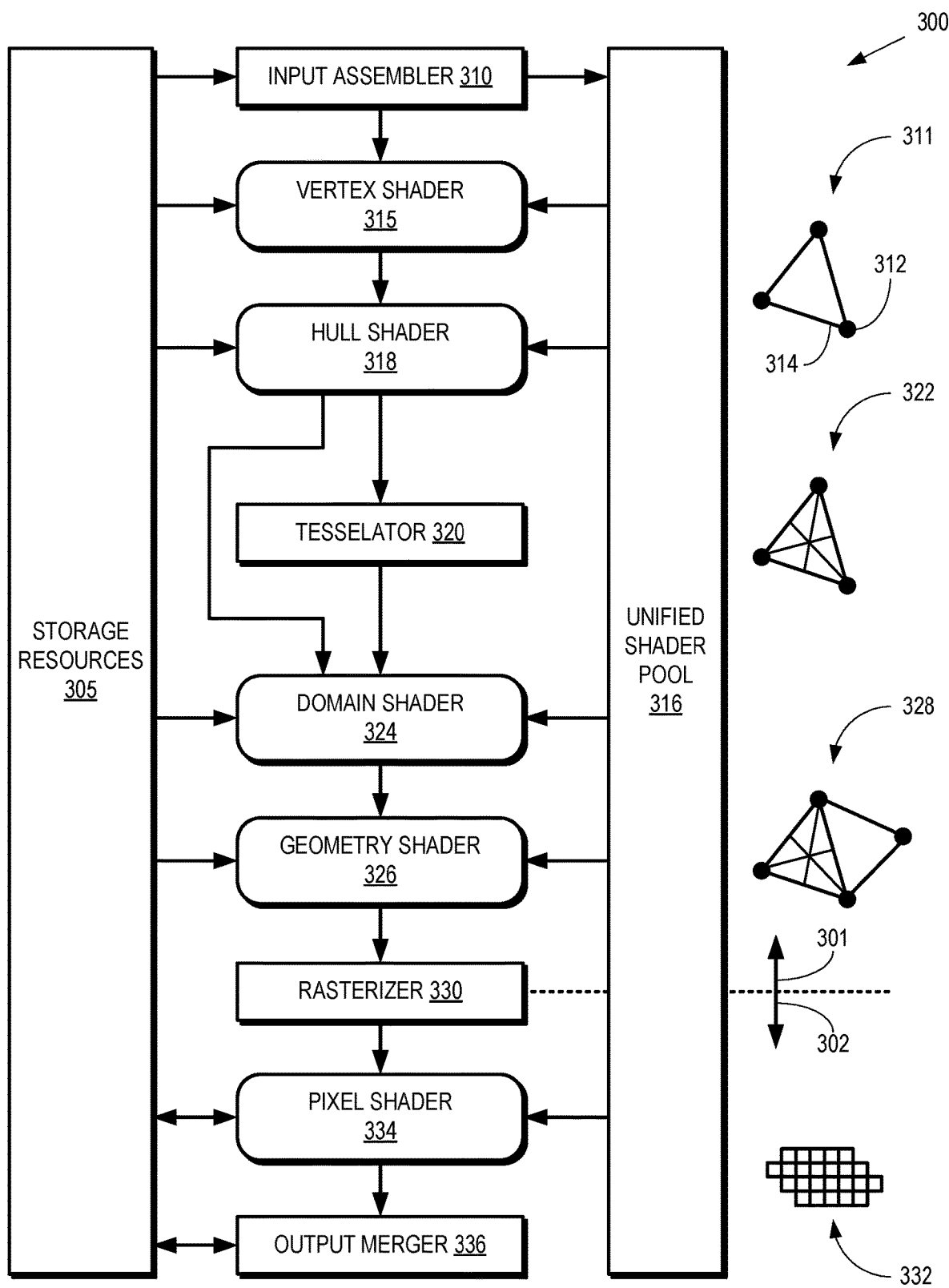
FIG. 3 depicts a graphics pipeline for processing high-order geometry primitives to generate rasterized images of three-dimensional (3D) scenes at a predetermined resolution according to some embodiments.

FIG. 3 depicts a graphics pipeline 300 that is capable of processing high-order geometry primitives to generate rasterized images of three-dimensional (3D) scenes at a predetermined resolution according to some embodiments. The graphics pipeline 300 is implemented in some embodiments of the GPU chiplets 106 shown in FIGS. 1 and 2. The illustrated embodiment of the graphics pipeline 300 is implemented in accordance with the DX11 specification. Other embodiments of the graphics pipeline 300 are implemented in accordance with other application programming interfaces (APIs) such as Vulkan, Metal, DX12, and the like. The graphics pipeline 300 is subdivided into a geometry portion 301 that includes portions of the graphics pipeline 300 prior to rasterization and a pixel processing portion 302 that includes portions of the graphics pipeline 300 subsequent to rasterization.

The graphics pipeline 300 has access to storage resources 305 such as a hierarchy of one or more memories or caches that are used to implement buffers and store vertex data, texture data, and the like. The storage resources 305 are implemented using some embodiments of the system memory 110 shown in FIG. 1.

An input assembler 310 accesses information from the storage resources 305 that is used to define objects that represent portions of a model of a scene. An example of a primitive is shown in FIG. 3 as a triangle 311, although other types of primitives are processed in some embodiments of the graphics pipeline 300. The triangle 303 includes one or more vertices 312 that are connected by one or more edges 314 (only one of each shown in FIG. 3 in the interest of clarity). The vertices 312 are shaded during the geometry processing portion 301 of the graphics pipeline 300.

A vertex shader 315, which is implemented in software in the illustrated embodiment, logically receives a single vertex 312 of a primitive as input and outputs a single vertex. Some embodiments of shaders such as the vertex shader 315 implement massive single-instruction-multiple-data (SIMD) processing so that multiple vertices are processed concurrently. The graphics pipeline 300 shown in FIG. 3 implements a unified shader model so that all the shaders included in the graphics pipeline 300 have the same execution platform on the shared massive SIMD compute units. The shaders, including the vertex shader 315, are therefore implemented using a common set of resources that is referred to herein as the unified shader pool 316. Some embodiments of the unified shader pool 316 are implemented using the WGP 202 shown in FIG. 2.

A hull shader 318 operates on input high-order patches or control points that are used to define the input patches. The hull shader 318 outputs tessellation factors and other patch data. In some embodiments, primitives generated by the hull shader 318 are provided to a tessellator 320. The tessellator 320 receives objects (such as patches) from the hull shader 318 and generates information identifying primitives corresponding to the input object, e.g., by tessellating the input objects based on tessellation factors provided to the tessellator 320 by the hull shader 318. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive. In the illustrated embodiment, the tessellator 320 generates primitives 322 by tessellating the triangle 311.

A domain shader 324 inputs a domain location and (optionally) other patch data. The domain shader 324 operates on the provided information and generates a single vertex for output based on the input domain location and other information. A geometry shader 326 receives an input primitive and outputs up to four primitives that are generated by the geometry shader 326 based on the input primitive. In the illustrated embodiment, the geometry shader 326 generates the output primitives 328 based on the tessellated primitive 322.

One stream of primitives is provided to a rasterizer 330 and, in some embodiments, up to four streams of primitives are concatenated to buffers in the storage resources 305. The rasterizer 330 performs shading operations and other operations such as clipping, perspective dividing, scissoring, and viewport selection, and the like. The rasterizer 330 generates a set 332 of pixels that are subsequently processed in the pixel processing portion 302 of the graphics pipeline 300.

In the illustrated embodiment, a pixel shader 334 inputs a pixel flow (e.g., including the set 332 of pixels) and outputs zero or another pixel flow in response to the input pixel flow. An output merger block 336 performs blend, depth, stencil, or other operations on pixels received from the pixel shader 334.

Some or all the shaders in the graphics pipeline 300 perform texture mapping using texture data that is stored in the storage resources 305. For example, the pixel shader 334 can read texture data from the storage resources 305 and use the texture data to shade one or more pixels. The shaded pixels are then provided to a display for presentation to a user.

Figure 4:
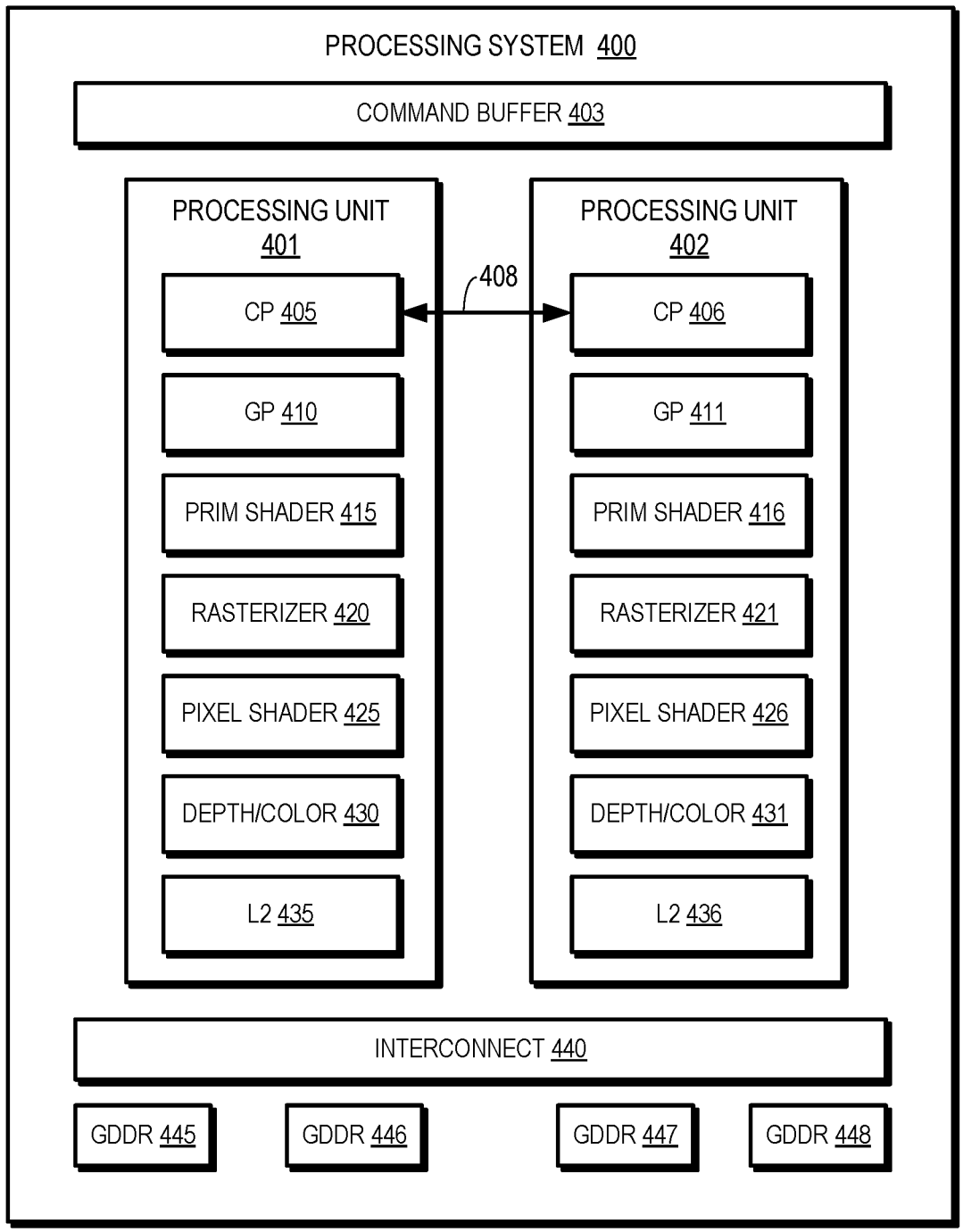
FIG. 4 is a block diagram of a processing system including multiple processing units that implement multiple graphics pipelines that read from a single command buffer according to some embodiments.

FIG. 4 is a block diagram of a processing system 400 including multiple processing units 401, 402 that implement multiple graphics pipelines that read from a single command buffer 403 according to some embodiments. In some embodiments, the processing units 401, 402 in the distributed architecture are GPUs, GPU cores, or chiplets. The processing system 400 is used to implement some embodiments of GPU chiplet array 104 shown in FIG. 1 and the array 200 of GPU chiplets shown in FIG. 2. Although two processing units 401, 402 are shown in FIG. 2, some embodiments of the processing system 400 include larger numbers of processing units.

The processing units 401, 402 instantiate graphics processing pipelines that perform graphics processing on graphics primitives based on the commands in the command buffer 403. The graphics pipelines include command processors (CP) 405, 406 that access copies of commands from the command buffer 403. For example, the command processor 405 accesses a first copy of a command from the command buffer 403 and the command processor 406 accesses a second copy of the same command from the command buffer 403.

The command processors 405, 406 exchange low latency signals over an interface 408. The commands stored in the command buffer 403 include synchronization points that indicate that concurrent processing of commands by the processing units 401, 402 should be stopped or interrupted until all the processing units 401, 402 have completed processing commands prior to the synchronization point. The processing units 401, 402 therefore stop or interrupt processing commands from the command buffer 403 in response to detecting a synchronization point. In the illustrated embodiment, the processing unit 401 is a primary processing unit and the processing unit 402 is a secondary processing unit. The processing unit 401 uses signals exchanged over the interface 408 to determine whether all the processing units 401, 402 have completed processing commands prior to the synchronization point. The processing unit 401 provides a low latency signal over the interface 408 to instruct the processing unit 402 to resume processing commands from the command buffer 403 in response to determining that the processing units 401, 402 have all completed processing commands prior to the synchronization point. The processing unit 401 also resumes processing commands from the command buffer 403.

The command processors 405, 406 generate signals that are passed to corresponding geometry process (GP) units 410, 411, which generate primitives for subsequent shading and rasterizing in the graphics pipelines implemented in the processing units 401, 402. One or more primitive shaders 415, 416 are used to shade the primitives provided by the geometry process units 410, 411. For example, as discussed herein with regard to FIG. 2, the primitive shaders 415, 416 can shade the vertices of triangles provided by the geometry process units 410, 411. The geometry processing is therefore duplicated for each of the primitives that are processed in the graphics pipelines supported by the processing units 401, 402, e.g., using duplicated sets of fixed function hardware blocks.

Rasterizers 420, 421 receive the shaded primitives and rasterize the shaded primitives to form sets of pixels. Pixel and compute processing are not duplicated by the graphics pipelines implemented in the processing units 401, 402. Instead, mutually exclusive subsets of the sets of pixels are processed in the pixel processing portion of the graphics pipelines. In the illustrated embodiment, a first subset is processed in the graphics pipeline implemented in the processing unit 401 and a second subset is processed in the graphics pipeline implemented in the processing unit 402. The first and second subsets are mutually exclusive, e.g., the pixel and compute processing is checkerboarded across the processing units 401, 402. Prior to launching pixel shader waves and performing depth testing, some embodiments of the graphics pipelines tile and scrape space the different processing units 401, 402. In the rasterization process performed by some embodiments of the rasterizers 420, 421, a workload that belongs to a tile on another processing unit does not get executed by the hardware. For example, if the rasterizer 420 in the processing unit 401 is generating pixels in a tile assigned to the graphics pipeline in the processing unit 401, the rasterizer 420 in the processing unit 402 does not generate pixels in that tile. Consequently, the processing system 400 achieves direct scaling with the number of processing units 401, 402.

Pixel shaders 425, 426 perform shading of the pixels generated by the rasterizers 420, 421. The workloads processed by the pixel shaders 425, 426 are checkerboarded so that the pixel shaders 425, 426 shade mutually exclusive subsets of the pixels. The shaded pixels are then provided to depth/color processing units 430, 431 for additional color operations, as well as depth testing, clipping, and other operations. The depth/color units 430, 431 provide the process pixels to corresponding graphics caches 435, 436, which are level 2 (L2) caches in the illustrated embodiment.

The processing system 400 includes a high bandwidth interconnection 440 that is used to facilitate communication between the processing units 401, 402. Some embodiments of the high bandwidth interconnection 440 also include a last level cache such as an L3 cache such as the L3 cache 210 implemented in the active bridge chiplet 118 shown in FIGS. 1 and 2. The processing units 401, 402 in the processing system 400 are associated with memory physical layer interfaces (PHY), which are denoted as graphics double data rate (GDDR) 445, 446, 447, 448 in FIG. 4 to indicate connection to GDDR memory.

Figure 5:
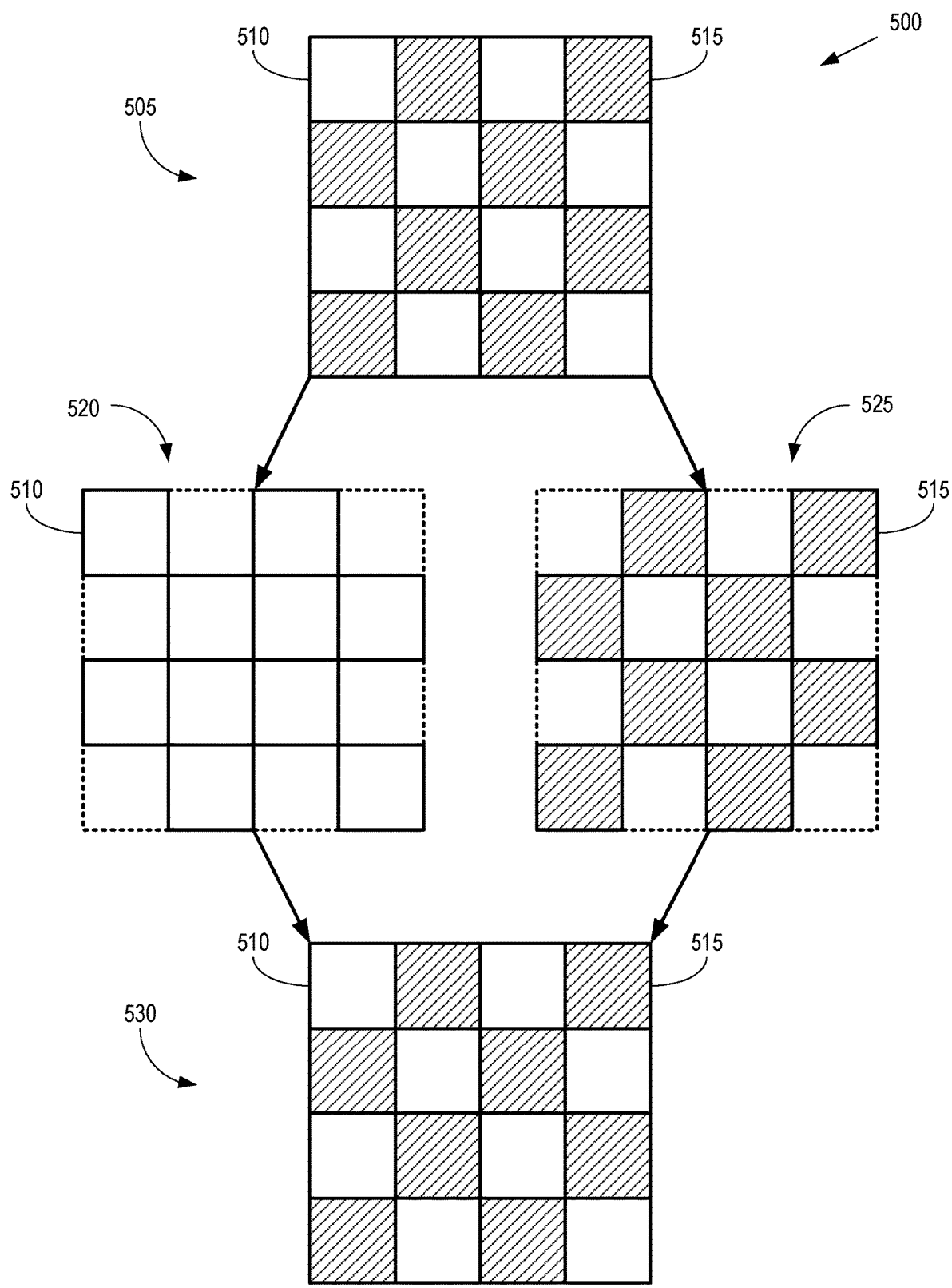
FIG. 5 is a block diagram of a checkerboarding process for concurrently processing mutually exclusive subsets of pixels in different graphics pipelines according to some embodiments.

FIG. 5 is a block diagram of a checkerboarding process 500 for concurrently processing mutually exclusive subsets of pixels in different graphics pipelines according to some embodiments. The checkerboarding process 500 is implemented in some embodiments of the processing system 100 shown in FIG. 1, the array 200 shown in FIG. 2, and the processing system 400 shown in FIG. 4.

In the illustrated embodiment, the pixels are organized for processing in a two-dimensional (2D) screen space 505. However, the pixels are organized in other dimensionalities in other embodiments such as one dimensional or three-dimensional arrays. Each pixel on the 2D screen space 505 represents a work item that is processed in a graphics pipeline. Sets of pixels are grouped into tiles having dimensions of N pixels×M pixels. Mutually exclusive sets of the tiles are assigned to different process units. In the illustrated embodiment, the 2D screen space 505 is partitioned into a first subset 510 of tiles (indicated by open boxes, only one tile indicated by a reference numeral in the interest of clarity) and a second subset 515 of tiles (indicated by crosshatched boxes, only one tile indicated by a reference numeral in the interest of clarity) to form an interleaved, checkerboard pattern.

The first subset 510 and the second subset 515 are selectively processed by corresponding processing units, such as GPUs, GPU cores, or chiplets. In the illustrated embodiment, the processing units have different unit identifiers that are associated with either the first subset 510 or the second subset 515. After the pixel work items are generated by rasterization, the processing units determine which subset two process based on a comparison of the unit identifier and the screen space location of the pixel. Processing units discard pixels that are not assigned to the processing unit. In the illustrated embodiment, a first processing unit processes the tiles in the first subset 510 and discards the tiles in the second subset 515, as indicated in the branch 520. The second processing unit processes the tiles in the second subset 515 and discards the tiles in the first subset 510, as indicated in the branch 525.

The shaded pixels in the first subset 510 and the second subset 515 of the tiles are merged by providing the tiles to a unified last level cache such as the L3 cache 210 shown in FIG. 2. In the illustrated embodiment, the first processing unit writes the shaded pixels from the first subset 510 to the unified last level cache and the second processing unit writes the shaded pixels from the second subset 515 to the unified last level cache. Thus, the first subset 510 and the second subset 515 are combined or merged into the 2D screen space 530.

Figure 6:
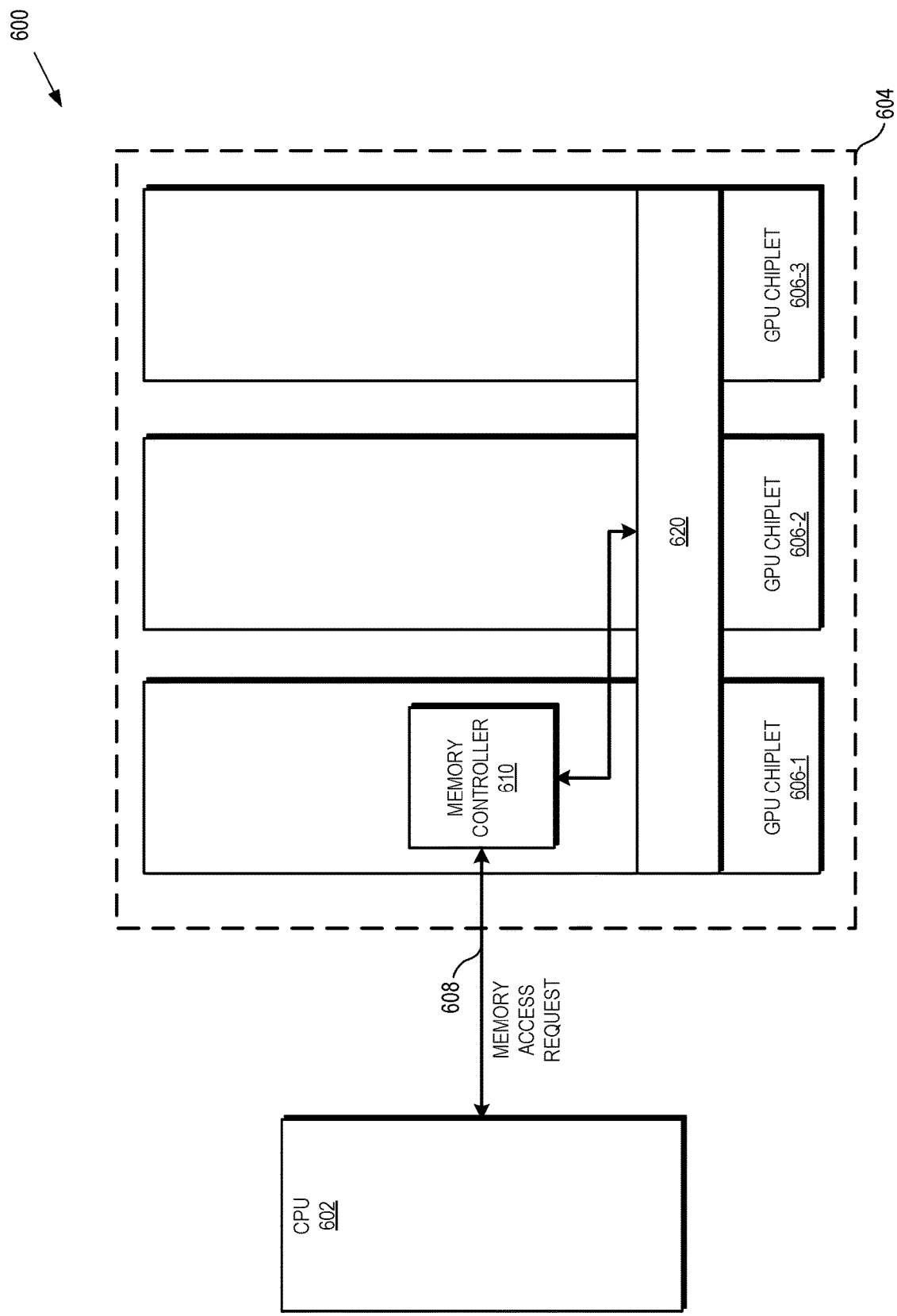
FIG. 6 is a block diagram of a processing system utilizing a three-chiplet configuration according to some embodiments.

FIG. 6 is a block diagram of a processing system 600 utilizing a three-chiplet configuration according to some embodiments. The processing system 600 is used to implement some embodiments of the processing system 100 of FIG. 1. The processing system 600 includes a CPU 602 and a GPU chiplet array 604 that includes three GPU chiplets, such as the illustrated GPU chiplets 606-1, 606-2, and 606-3. The CPU 602 communicates with GPU chiplet 606-1 via the interface 608. The GPU chiplet 606-1 is therefore a primary chiplet and the GPU chiplets 606-2 and 606-3 are secondary chiplets that communicate with the CPU 602 indirectly via the active bridge chiplet 618. Accordingly, the primary GPU chiplet 606-1 serves as the singular entry point from the CPU 602 to the entire GPU chiplet array 604.

Some embodiments of the CPU 602 transmit an access request (e.g., read request, write request, instruction to perform work at the GPU chiplets 606, and the like) to the primary GPU chiplet 606-1 via an interface 608. As previously described in more detail with respect to FIG. 2, the GPU chiplet 606-1 includes a plurality of workgroup processors (not shown) and a plurality of fixed function blocks (not shown). The GPU chiplet 606-1 also includes a memory controller 610 that connects to the last level cache (LLC) of the GPU chiplet array 604. The LLC of the GPU chiplet array 604 is implemented in an active bridge chiplet 620, e.g., in the same manner as the L3 cache 210 shown in FIG. 2. The memory controller 610 also handles routing between the LLC and electrically-active portions of the logic of data fabric crossbars (e.g., SDF 216 shown in FIG. 2).

The memory controller 610 determines whether data associated with the access request is locally cached at memory coherent only within the single primary GPU chiplet 606-1 or whether the data is cached in the unified L3 cache 210 at the active bridge chiplet 620. Based on determining that the data associated with the access request is locally cached at memory coherent within the single primary GPU chiplet 606-1, the memory controller 610 services the access request at the primary GPU chiplet 606-1. However, based on determining that the data associated with the access request is cached at the commonly shared L3 cache 210, the memory controller 610 routes the access request to the active bridge chiplet 620 for servicing. The active bridge chiplet 620 returns the result back to primary GPU chiplet 606-1, which subsequently returns the requested data to the originating requestor (e.g., CPU 602). In this manner, the CPU 602 only has a single external view and does not require direct communications to two or more GPU chiplets 106 via interface 608.

Those skilled in the art will recognize that although FIG. 6 is described here in the specific context of a rectangular active bridge chiplet die 620 spanning across the middle of three GPU chiplets, various other configurations, die shapes, and geometries are utilized in various embodiments without departing from the scope of this disclosure. In some embodiments, GPU chiplets include active bridge chiplets at one or more corners of a square GPU chiplet such that multiple GPU chiplets are tiled together in a chiplet array. Similarly, in other embodiments, GPU chiplets include active bridge chiplets spanning an entire side of a GPU chiplet such that multiple GPU chiplets are strung together in a long row/column configuration with an intervening active bridge chiplet. A similar architecture is also employed to coordinate operation of multiple GPUs, GPU cores, and other processors.

Figure 7:
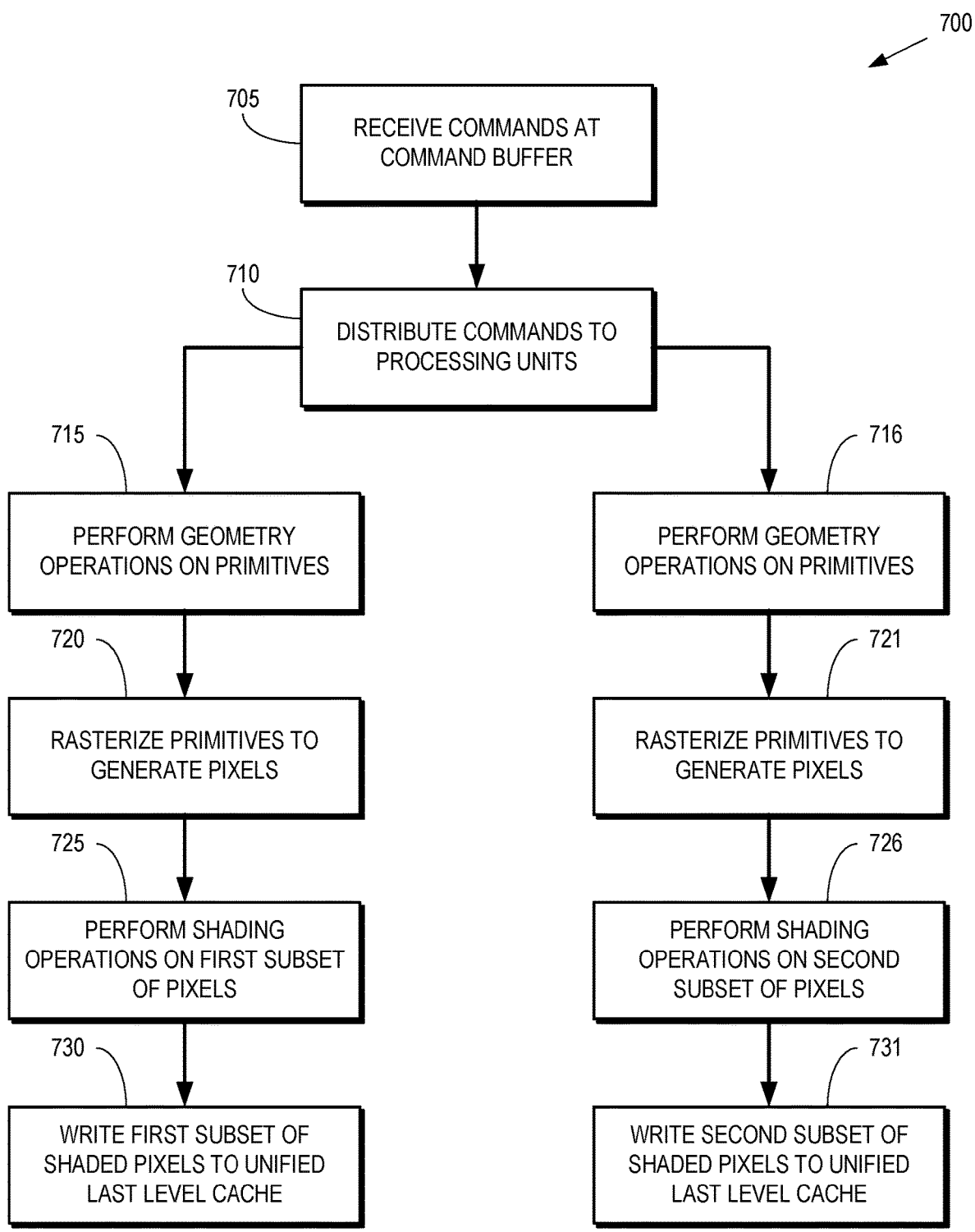
FIG. 7 is a flow diagram of a method of concurrently performing graphics processing using duplicated fixed function hardware blocks and non-duplicated pixel shading according to some embodiments.

FIG. 7 is a flow diagram of a method 700 of concurrently performing graphics processing using duplicated fixed function hardware blocks and non-duplicated pixel shading according to some embodiments. The method 700 is implemented in some embodiments of the processing system 100 shown in FIG. 1, the array 200 shown in FIG. 2, the processing system 400 shown in FIG. 4, and the processing system 600 shown in FIG. 6. In the illustrated embodiment, the processing system includes two graphics pipelines that implement duplicate fixed function hardware blocks and shaders. However, in some embodiments, the processing system implements more graphics pipelines to provide additional concurrent processing.

At block 705, commands received in a command buffer of the processing system. In some embodiments, the command buffer is implemented in a GPU that receives commands, such as draw calls, from a CPU.

At block 710, the commands are distributed to the processing units that implement the two graphics pipelines. In some embodiments, copies of the commands are accessed by command processors in the two graphics pipelines. The flow of the method 700 then splits into branches that are concurrently performed by the two graphics pipelines.

At blocks 715, 716, the graphics pipelines perform geometry operations on primitives according to the copies of the commands. The geometry operations are performed by duplicated fixed function hardware blocks in the two graphics pipelines.

At blocks 720, 721, rasterizers in the two graphics pipelines rasterized the primitives to generate sets of pixels for the pixel processing portion of the graphics pipelines. In some embodiments, the pixels are grouped into tiles that are selectively processed by one or the other graphics pipeline.

At blocks 725, 726, the graphics pipelines perform shading operations on mutually exclusive subsets of the pixels. In the illustrated embodiment, a first graphics pipeline performs shading operations on a first subset of the pixels and a second graphics pipeline performs shading operations on a second subset of the pixels. The graphics pipelines identify the corresponding subsets based on identifiers of the corresponding processing units and screen space locations of the pixels or tiles.

At blocks 730, 731, the graphics pipelines write the corresponding subsets of shaded pixels to a unified last level cache, such as the L3 cache 210 shown in FIG. 2. The unified LLC memory space provides a unified render target that receives the mutually exclusive subsets that were processed by the different graphics pipelines. Thus, there is no post-processing needed to merge results from the two processing units because the processing units are writing data to specific memory addresses for the tiles that are assigned to the processing units.

In some embodiments, the apparatus and techniques described above are implemented in a system including one or more integrated circuit (IC) devices (also referred to as integrated circuit packages or microchips), such as the distributed architecture described above with reference to FIGS. 1-7. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes, for example, instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions are stored on the non-transitory computer readable storage medium in source code, assembly language code, object code, or other instruction format that is interpreted or otherwise executable by one or more processors.

Note that not all of the activities or elements described above in the general description are required, that a portion of a specific activity or device is required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus comprising:
   a plurality of processing units configured to access a plurality of copies of a command from a command buffer, the command indicating geometry operations to be performed on a set of primitives, and wherein the plurality of processing units comprise:
      first processing units each configured to perform the geometry operations concurrently on the set of primitives, and second processing units to process mutually exclusive sets of pixels generated by rasterizing the set of primitives; and
a cache to temporarily store the mutually exclusive sets of pixels after shading by one or more of the plurality of processing units.

2. The apparatus of claim 1, wherein the plurality of processing units comprises at least one of a graphics processing unit (GPU), a GPU core, and a chiplet.

3. The apparatus of claim 1, wherein the plurality of processing units comprises a first chiplet and a second chiplet, and wherein the first chiplet is configured to access a first copy of the command from the command buffer and the second chiplet is configured to access a second copy of the command from the command buffer.

4. The apparatus of claim 3, wherein the first chiplet comprises first fixed function hardware blocks configured to perform the geometry operations indicated by the first copy of the command on the set of primitives, and wherein the second chiplet comprises second fixed function hardware blocks configured to perform the geometry operations indicated by the second copy of the command on the set of primitives.

5. The apparatus of claim 4, wherein the first chiplet comprises a first rasterizer configured to generate a first set of pixels from the set of primitives, and wherein the second chiplet comprises a second rasterizer configured to generate a second set of pixels from the set of primitives.

6. The apparatus of claim 5, wherein the first chiplet comprises at least one first shader configured to shade a first subset of the first set of pixels, wherein the second chiplet comprises at least one second shader configured to shade a second subset of the second set of pixels, and wherein the first subset and second subset are mutually exclusive.

7. The apparatus of claim 1, wherein the plurality of processing units includes a primary processing unit and at least one secondary processing unit, wherein the primary processing unit and the at least one secondary processing unit are configured to stop processing commands from the command buffer in response to detecting a synchronization point.

8. The apparatus of claim 7, wherein the primary processing unit is configured to determine whether the plurality of processing units have all completed processing commands prior to the synchronization point based on low latency signals exchanged between the primary processing unit and the at least one secondary processing unit.

9. The apparatus of claim 8, wherein the primary processing unit is configured to provide a low latency signal to instruct the at least one secondary processing unit to resume processing commands from the command buffer in response to determining that the plurality of processing units have all completed processing commands prior to the synchronization point.

10. The apparatus of claim 1, wherein the plurality of processing units is disposed at a substrate.

11. A method comprising:
accessing, from a plurality of processing units, a plurality of copies of a command from a command buffer, the command indicating geometry operations to be performed on a set of primitives;
concurrently performing, for each copy of the command, the geometry operations on the set of primitives;
concurrently processing, on different subsets of the plurality of processing units, mutually exclusive sets of pixels generated by rasterizing the set of primitives; and
providing the mutually exclusive sets of pixels to a cache after shading by one or more of the plurality of processing units.

12. The method of claim 11, wherein the plurality of processing units comprises a first processing unit and a second processing unit, and wherein accessing the plurality of copies comprises:
accessing, from the first processing unit, a first copy of the command from the command buffer; and
accessing, from the second processing unit, a second copy of the command from the command buffer.

13. The method of claim 12, wherein performing the geometry operations comprises:
performing, using first fixed function hardware blocks in the first processing unit, the geometry operations indicated by the first copy of the command on the set of primitives; and
performing, using second fixed function hardware blocks in the second processing unit, geometry operations indicated by the second copy of the command on the set of primitives.

14. The method of claim 13, further comprising:
rasterizing the set of primitives processed in the first fixed function hardware blocks to generate a first set of pixels; and
rasterizing the set of primitives processed in the second fixed function hardware blocks to generate a second set of pixels from the set of primitives.

15. The method of claim 14, further comprising:
shading a first subset of the first set of pixels in at least one first shader implemented in the first processing unit; and
shading a second subset of the second set of pixels in at least one second shader implemented in the second processing unit, wherein the first subset and second subset are mutually exclusive.

16. The method of claim 11, wherein the plurality of processing units comprises a primary processing unit and at least one secondary processing unit, and further comprising:
interrupting processing of commands from the command buffer at the primary processing unit in the at least one secondary processing unit in response to detecting a synchronization point.

17. The method of claim 16, further comprising:
exchanging low latency signals between the primary processing unit and the at least one secondary processing unit to indicate whether processing of the commands prior to the synchronization point is complete.

18. The method of claim 17, further comprising:
providing, from the primary processing unit, a low latency signal to instruct the at least one secondary processing unit to resume processing commands from the command buffer in response to determining that the plurality of processing units have all completed processing commands prior to the synchronization point.

19. The method of claim 11, wherein the plurality of processing units is formed on a substrate.

20. A processing unit comprising:
at least one first fixed function hardware block configured to access a command from a command buffer and perform geometry operations indicated by the command on a set of primitives concurrently with at least one second fixed function hardware block in at least one other processing unit performing the geometry operations indicated by the command on the set of primitives;

a rasterizer configured to generate a set of pixels from the set of primitives provided by the at least one first fixed function hardware block; and at least one first shader configured to process a first subset of the set of pixels to generate a shaded first subset of pixels and provide the shaded first subset of pixels to a cache concurrently with at least one second shader in the at least one second processing a second subset of the set of pixels to generate a shaded second subset of pixels and providing the shaded second subset of pixels to the cache, wherein the first subset and the second subset are mutually exclusive.

21. The processing unit of claim 20, wherein the processing unit is configured to stop processing commands from the command buffer in response to detecting a synchronization point.

22. The processing unit of claim 21, wherein first processing unit is configured to exchange low latency signals with the at least one other processing unit to determine whether the processing unit and the at least one other processing unit have all completed processing commands prior to the synchronization point, and wherein the processing unit and the at least one other processing unit are configured to resume processing commands from the command buffer in response to determining that the processing unit and the at least one other processing unit have all completed processing commands prior to the synchronization point.

* * * * *